June 17, 1952  V. T. MAXWELL  2,600,898
HYDRAULICALLY OPERATED VALVE SEAT
Filed May 28, 1948
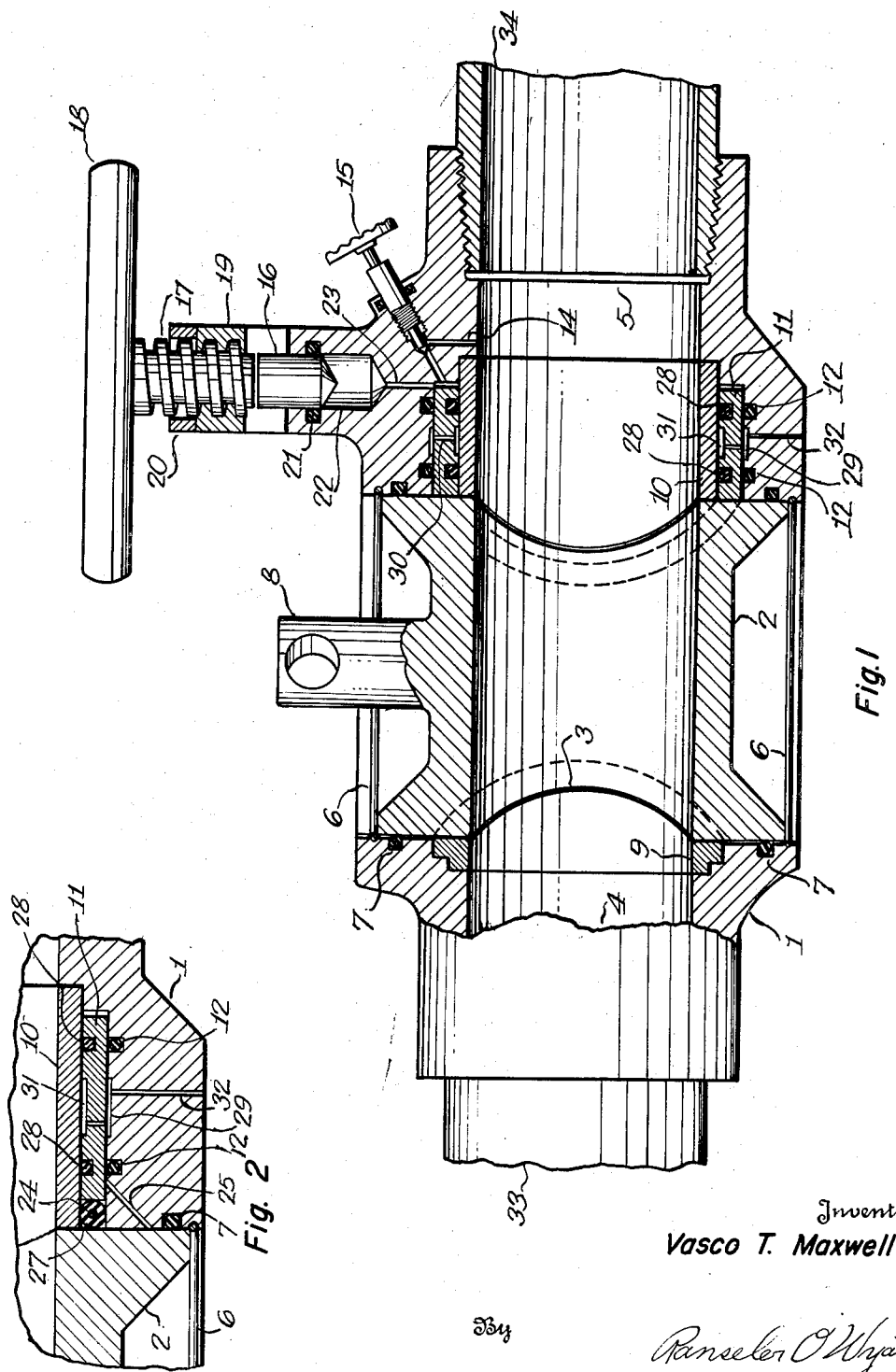
Inventor
Vasco T. Maxwell Patented June 17, 1952

2,600,898

UNITED STATES PATENT OFFICE 2,600,898

HYDRAULICALLY OPERATED VALVE SEAT

Vasco T. Maxwell, Houston, Tex.

Application May 28, 1948, Serial No. 29,879

4 Claims. (Cl. 251—113)

This invention relates to new and useful improvements in a valve.

An object of the invention is to provide a plug valve having novel means for sealing said valve from leakage.

Another object of the invention is to provide a plug valve having a novel sealing means that may be readily moved into and out of sealing position and that may be maintained in sealing position by the pressure in the flow line.

Another object of the invention is to provide a valve having a novel sealing means adapted to be moved into and out of sealing relation by fluid under pressure.

In flow line valves, the contents of the line is often under high pressure and in instances where such contents contain sandy or gritty substances, the packing means of the conventional valve, being of flexible material, as rubber, are readily worn causing leaks. It is an object of this invention to provide a valve having novel means for sealing off the packing means of the valve, preventing the exposure of said conventional packing means to the pressure of the flow and exposing the conventional packing means to said flow pressure only during rotation of the valve plug.

With the above and other objects in view, the invention is more particularly described in the following specification and illustrated in the accompanying drawings, wherein:

Figure 1 is a side elevational view of the valve, partly in cross section, and

Figure 2 is a sectional view of an additional adaptation of the device.

In the drawings the numeral 1 designates a valve casing in which the valve plug 2 is mounted. The plug 2 is cylindrical in shape and has a port 3 therethrough which may be brought into alignment with the ports 4 and 5 of the valve casing. The plug 2 being of slightly less diameter than the board, permits easy rotation of the plug. A pair of snap rings as 6, 6 fit into suitable grooves in the casing 1 and abut against the outer ends of the plug 2, maintaining said plug 2 in vertical position in the casing 1 but permitting the rotation of the plug. A projection 8, on the plug 2, is adapted to receive a wrench, or other means for rotating the plug in the casing to move the port 3 into and out of alignment with the ports 4 and 5, said ports 4 and 5 constituting the outlet and inlet openings, respectively, for the valve.

Suitable grooves as 7, 7 in the casing 1 are adapted to receive packing to seal off the fluid in the flow line from escape around the plug 2.

An annular insert 9, preferably formed of brass is mounted in a groove in the inner walls of the casing 1 and is shaped to conform to the contour of and fit snugly against the plug 2. The casing 1 is grooved annularly to receive the annular ring 10 composed of steel or similar material which abuts against and retains in place an annular shuttle ring 11. Said shuttle ring 11 has suitable grooves as 28, 28 in the surface abutting said ring 10, in which suitable packing may be carried. The shuttle ring 11 fits in an elongated groove in the casing 1 of sufficient greater length than the width of the shuttle to permit its free movement therein. Packing grooves as 12, 12 in the casing 1 abut against said shuttle ring 11 and carry suitable packing to prevent leakage of fluid from the flow line. The pressure of the packing against the shuttle ring and the pressure of the ring against the wall of the groove in which it operates causes a pressure to be built up in the groove in the casing 1 between the packing grooves upon movement of the ring, which pressure is referred to in the art as friction pressure. There is an annular groove 31 in the shuttle ring 11 from which a series of ports as 30, 30, lead into the annular groove 29 in the casing 1 from which the ports 32 lead to the free atmosphere, which grooves and ports bleed off the friction pressure trapped around the ring 11 between the packing which may be occasioned by the movement of the shuttle ring 11.

Mounted in the casing 1 is a suitable needle valve as 15, controlling the passageway 14 leading from the flow line through the casing to the groove in the casing in which the shuttle ring 11 is mounted. An upstanding yoke 20 mounted on the casing 1 and integral therewith, supports the valve wheel 18 which has the threaded shank 17 and retaining nut 19. The lower end of the stem 17 abuts against the upper end of the piston 16 which is mounted in the hydraulic fluid chamber 22. There is a groove 21 in the wall of the chamber 22 adapted to receive a suitable packing which will be compressed by the walls of the piston 16 thus preventing escape of the hydraulic fluid from the chamber 22.

When the plug 2 is mounted in the casing 1 and the port therethrough is aligned with the ports in the casing leading to the connecting lengths of pipe of the flow line 33, 34, the insert 9 will act as a bearing and will form a close fit all around the port through the plug 2 and the ring 10 will act as a bearing at the opposing port in the plug 2. The direction of flow in the flow line will be from the pipe 34 to the pipe 33. When the plug 2 is moved into connecting position to permit the flow of fluid therethrough, the wheel 18 is turned to move the stem 17 downwardly forcing the piston 16 downwardly into the chamber 22 in which a suitable hydraulic fluid is stored which will be forced through the passageway 23 against the shuttle ring 11 moving same tightly against the plug 2. The needle valve 15 is then backed off to permit the pressure of the contents of the flow line to be exerted through the port 14 against the shuttle ring 11, balancing the pressure of the flow line against the shuttle ring 11. When it is desired to stop the flow through the plug 2, the needle valve 15 is tightened, blocking the port 14, and the wheel 18 then turned to raise the stem 17 and permit the piston 16 to rise in the chamber 22, thus relieving the pressure against the shuttle ring 11 permitting the shuttle ring 11 to yield to the pressure of the flow line and to be moved away from the plug 2, thus permitting the easy rotation of the plug 2 into closed position, whereupon the shuttle ring 11 may again be locked against the plug 2 as above described. The grooves and ports 29, 30, 31 and 32 bleed off the pressure occasioned by the friction of the movement of the shuttle ring 11.

In the view shown in Figure 2, a packing ring 24, having a spring metal center 27, and which is of slightly less circumference than the width of the shuttle ring groove, is inserted in the shuttle ring groove and against which one end of the shuttle ring 11 abuts. A port 25 leads from the shuttle ring groove to the plug bore. Where sandy or gritty fluid is being passed through the flow line, the packing, as 27, is used with the shuttle ring 11 as illustrated in Figure 2. When pressure is applied to the shuttle ring 11, the ring 24 will be compressed against the plug. When the hydraulic pressure is released by blocking the port 14 and withdrawing the piston 16, the spring in the ring 24 will cause the ring to resume its shape, allowing the line pressure to leak past the ring 27 and pressure will be built up against the ring 11 moving same rearwardly. The pressure then will flow around the ring 11, which is packed, against the O-rings 12, 28, and through the port 25 and will be equalized around the ring 27, urging same tightly against the ring 11, permitting the rotation of the plug 2.

The embodiments of the invention herein shown and described are to be regarded as illustrative only, and it is to be understood that the invention is susceptible to variation, modification and change within the scope of the appended claims.

What I claim is:

1. In a valve, a valve housing having a fluid inlet port and a fluid outlet port, a cylindrical plug rotatably mounted in said housing, a port in said plug adapted to be moved into and out of flow connection with said inlet and outlet ports, a bearing of brass mounted in said housing adjacent said outlet port shaped to conform to the contours of and adapted to fit snugly against said plug, a movable shuttle ring mounted in said housing adjacent said inlet ports shaped to conform to the contours of said plug and an auxiliary hydraulic ram adapted to selectively move said ring into and out of contact with said plug and maintained in contact with said plug by the pressure of the flow, transverse passageways through said shuttle ring leading to passageways through said housing to relieve pressure caused by friction of said ring against the abutting walls of the housing.

2. In a valve, a valve housing having a fluid inlet port and a fluid outlet port, a cylindrical plug rotatably mounted in said housing, a port in said plug adapted to be moved into and out of flow connection with said inlet and outlet ports, a bearing mounted in said housing adjacent said outlet port shaped to conform to the contours of and adapted to fit snugly against said plug, a movable shuttle ring mounted in said housing adjacent said inlet ports shaped to conform to the contours of said plug and means for subjecting said ring to hydraulic pressure greater than the pressure of the flow to move same into contact with said plug and for relieving said pressure to move said ring out of contact with said plug, a passageway in said housing wall directing a flow of line pressure against said shuttle, means for retaining said shuttle ring in movable position in said housing, said shuttle ring and said retaining means having cooperating pressure relief ports.

3. A valve comprising a valve housing, inlet and outlet ports in said housing, a plug rotatably mounted in said housing, a port in said plug adapted to be brought into and out of flow connection with said inlet and outlet ports, a stationary and a movable reinforcing bearing mounted in said housing in contact with said plug, means for moving said movable bearing into contact with said plug comprising a hydraulic fluid chamber in connection with said movable bearing, a hydraulic fluid therein, a piston adapted to be moved into and out of said chamber, forcing said hydraulic fluid against and releasing it from said movable bearing, a passageway leading from the flow chamber of said housing to the movable bearing to permit the pressure from said flow chamber to be inserted against said movable bearing and means for selectively blocking said passageway.

4. In a valve, a valve housing, inlet and outlet ports in said housing, a rotatable plug in said housing, a fluid passageway through said plug adapted to be brought into alignment with said inlet and outlet ports, packing means between said plug and housing for blocking the flow of fluid into or out of said housing from around said plug, a shuttle ring movably mounted in said housing adapted to be brought into contact with said plug adjacent said inlet port, a retainer ring in said housing maintaining said shuttle ring in position, a pair of packing grooves in said housing abutting the periphery of said shuttle ring, flexible packing in said grooves adapted to be slightly compressed by said shuttle ring, a pair of packing grooves in the inside periphery of said shuttle ring, flexible packing mounted in said grooves and adapted to abut against said retainer ring, annular chambers in said housing and said shuttle ring between said packing grooves, relief ports extending through said shuttle ring into said chambers and through said housing into the free atmosphere.

VASCO T. MAXWELL.

REFERENCES CITED

The following references are of record in the file of this patent:

UNITED STATES PATENTS

| Number | Name | Date |
|---|---|---|
| 783,953 | Henry | Feb. 28, 1905 |
| 1,616,386 | O'Stroske | Feb. 1, 1927 |
| 1,954,018 | Miller | Apr. 10, 1934 |
| 2,030,458 | McKellar | Feb. 11, 1936 |
| 2,356,630 | Strecker | Aug. 22, 1944 |

FOREIGN PATENTS

| Number | Country | Date |
|---|---|---|
| 530,687 | Germany | 1931 |
| 520,188 | Germany | 1931 |